United States Patent
Nishiura et al.

(10) Patent No.: US 7,045,242 B2
(45) Date of Patent: May 16, 2006

(54) ION-CONDUCTIVE POLYMERIC COMPOUND, POLYMERIC ELECTROLYTE AND ELECTRIC DEVICE

(75) Inventors: Masahito Nishiura, Hyogo (JP); Michiyuki Kono, Neyagawa (JP); Masayoshi Watanabe, Yokohama (JP)

(73) Assignee: Dai-Ichi Kogyo Seiyaku Co., Ltd., Kyoto (JP)

( * ) Notice: Subject to any disclaimer, the term of this patent is extended or adjusted under 35 U.S.C. 154(b) by 82 days.

(21) Appl. No.: 10/835,816

(22) Filed: Apr. 30, 2004

(65) Prior Publication Data

US 2004/0202912 A1  Oct. 14, 2004

Related U.S. Application Data

(63) Continuation of application No. 09/787,233, filed as application No. PCT/JP00/05811 on Aug. 28, 2000, now abandoned.

(30) Foreign Application Priority Data

| Sep. 2, 1999 | (JP) | 11-248887 |
| Sep. 2, 1999 | (JP) | 11-248888 |
| Sep. 2, 1999 | (JP) | 11-248889 |
| Nov. 9, 1999 | (JP) | 11-318000 |

(51) Int. Cl.
*H01M 8/10* (2006.01)

(52) U.S. Cl. .................. 429/33; 429/330

(58) Field of Classification Search ............. 429/306, 429/317, 4, 8, 33, 330, 331, 332, 337, 338, 429/342; 528/4, 8
See application file for complete search history.

(56) References Cited

U.S. PATENT DOCUMENTS 4,620,944 A * 11/1986 Armand et al. .......... 252/519.2

* cited by examiner

*Primary Examiner*—Michael Barr
*Assistant Examiner*—Monique Wills
(74) *Attorney, Agent, or Firm*—Jordan and Hamburg LLP

(57) ABSTRACT

Polymeric compounds are provided the use of which expedites dissociation of an electrolytic salt. The polymeric compounds have a trivalent boron atom which is a Lewis acid. Transport rates of charge carrier ions can be controlled by trapping counter ions of charge carrier ions in the polymeric chain.

27 Claims, No Drawings

ION-CONDUCTIVE POLYMERIC COMPOUND, POLYMERIC ELECTROLYTE AND ELECTRIC DEVICE

REFERENCE TO RELATED APPLICATION

This is a continuation of and incorporates the entire disclosure of application Ser. No. 09/787,233 now abandoned, filed Apr. 25, 2001.

TECHNICAL FIELD

The present invention relates to a novel ion-conductive polymeric compound, a polymeric electrolyte and an electric device using the same.

BACKGROUND OF THE INVENTION

According to the development of cells having a high voltage and a high capacity, a large number of various polymeric electrolytes have been proposed. However, polymeric electrolytes have an ionic conductivity which is lower than that of aqueous electrolytes by more than one figure. Further, for example, a polymeric electrolyte using polyethylene glycol has defects that it is low in transfer and transport rates of charge carrier ions. Thus, attempts of improvement have been made by using various methods.

In view of the foregoing, the invention has been made, and it aims to provide a polymeric electrolyte which is improved in a transport rate of charge carrier ions. Moreover, the invention provides a novel ion-conductive polymeric compound used in the polymeric electrolyte, and further an electric device such as a cell or the like, which is improved in performance by using the polymeric electrolyte.

DISCLOSURE OF THE INVENTION

The present inventors have assiduously conducted investigations to solve the problems, and have consequently found that dissociation of an electrolytic salt can be expedited by using a polymeric compound having a trivalent boron atom in the structure (hereinafter referred to as a trivalent boron-containing polymeric compound or an ion-conductive polymeric compound) which is a Lewis acid and a transport rate of charge carrier ions can be controlled by trapping counter ions of charge carrier ions in the polymeric chain.

Further, it has been found that a transport rate of charge carrier ions is also improved by incorporating a polymeric compound containing a tetravalent boron atom (hereinafter referred to as a tetravalent boron-containing polymeric compound) in a polymeric electrolyte.

The invention is based on these findings. That is, in the ion-conductive polymeric compound of the invention, one or more trivalent boron atoms are present in the polymeric structure. Specific examples thereof include the following three.

The first compound is represented by the following general formula (1).

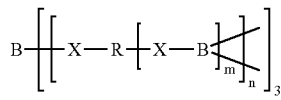
(1)

In formula (1), X represents a hetero-atom, R represents a divalent to hexavalent group having a molecular weight of at least 150, m represents an integer of 1 to 5, and n represents a recurring number of 1 or more.

The second compound is that obtained by crosslinking a compound represented by the following general formula (7).

(7)

In formula (7), X represents a hetero-atom, R represents a divalent group having a molecular weight of at least 150, and Y represents a polymerizable functional group.

The third compound is a compound in which a boron atom is present in, for example, a polymeric side chain, preferably a compound in which a boron atom is bound to an end of a polymeric main chain and/or a polymeric side chain as a part of a boron compound, more preferably a compound in which a boron atom is bound to an end of a polymeric side chain as a part of an organoboron compound.

The first of polymeric electrolytes of the invention contains one or more of the foregoing ion-conductive polymeric compounds and an electrolytic salt and further, as required, a nonaqueous solvent.

As the electrolytic salt, for example, a lithium salt is used, and as the nonaqueous solvent, for example, an aprotic solvent is used.

Further, the second polymeric electrolyte of the invention contains a tetravalent boron-containing polymer, and further, as required, an aprotic solvent and/or an electrolytic salt.

Moreover, the electric device of the invention uses any of the polymeric electrolytes. For example, when the electric device is a cell, a positive electrode and a negative electrode are linked through any of the polymeric electrolytes.

BEST MODE FOR CARRYING OUT THE INVENTION

Preferable embodiments of the invention are described below. However, the invention is not limited thereto.

1. Boron-containing Polymeric Compound (1) First Ion-conductive Polymeric Compound The first of the ion-conductive polymeric compounds of the invention is represented by the following general formula (1) as described above.

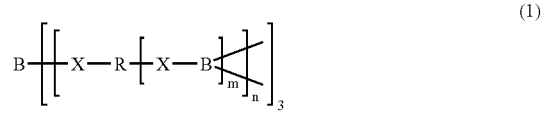
(1)

In formula (1), X represents a hetero-atom, R represents a divalent to hexavalent group having a molecular weight of at least 150, m represents an integer of 1 to 5, and n represents a recurring number of 1 or more.

The hetero-atom represented by X in formula (1) is preferably an oxygen atom. The molecular weight of R is at least 150, preferably at least 150 and at most 1,700,000. n is preferably at least 1 and at most 100.

R in formula (1) is preferably a polymer or a copolymer of compound (A) represented by the following formula (2) and/or compound (B) represented by the following formula (3).

compound (A)

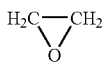
(2)

compound (B)

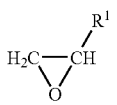
(3)

In formula (3), $R^1$ represents a methyl group, an ethyl group, a propyl group, a butyl group or a group represented by the following formula (4).

$$-CH_2O-[-CH_2CH_2O-]_r-Ra \qquad \text{formula (4)}$$

In formula (4), r is 0 or an integer of 1 or more, and Ra represents a methyl group, an ethyl group, a propyl group or a butyl group.

The ion-conductive polymeric compound is especially preferably a compound represented by the following general formula (5).

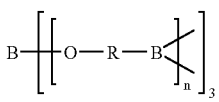
(5)

In formula (5), R represents a divalent group having a molecular weight of at least 150, represented by the following formula (6), and n represents a recurring number of 1 or more.

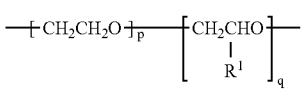
(6)

In formula (6), R1 represents a methyl group, an ethyl group, a propyl group, a butyl group or a group represented by formula (4), p represents an integer of 0 to 38,000, and q represents an integer of 0 to 28,000, provided p and q are not 0 at the same time. The molecular weight of R in formula (5) is preferably at least 150 and at most 1,700,000. The recurring number represented by n is preferably at least 5 and at most 100.

(2) Second Ion-conductive Polymeric Compound

The second ion-conductive polymeric compound is obtained by crosslinking a compound represented by the following general formula (7).

$$B\!+\!X\!-\!R\!-\!Y]_3 \qquad (7)$$

In formula (7), X represents a hetero-atom, R represents a divalent group having a molecular weight of at least 150, and Y represents a polymerizable functional group.

R in general formula (7) is not particularly limited. It is preferably a polymer or a copolymer of compound (A) represented by formula (2) and/or compound (B) represented by formula (3).

The molecular weight of R in formula (7) is at least 150, preferably at least 150 and at most 1,700,000.

The compound represented by general formula (7) is especially preferably a compound represented by the following general formula (8).

$$B\!+\!O\!-\!R\!-\!Y]_3 \qquad (8)$$

In formula (8), R represents a divalent group having a molecular weight of at least 150, represented by formula (6), and Y represents a polymerizable functional group. The molecular weight of R is preferably at least 150 and at most 1,700,000.

The polymerizable functional group Y in formulas (7) and (8) are not particularly limited. Preferable examples thereof include an acrylic residue, a methacrylic residue, an allyl group and a vinyl group.

(3) Third Ion-conductive Polymeric Compound

The third ion-conductive polymeric compound is, as mentioned above, for example, a compound in which one or more boron atoms are present in a polymeric side chain, preferably a compound in which one or more boron atoms are bound to an end of a polymeric main chain and/or a polymeric side chain as a part of a boron compound, more preferably to an end of a polymeric side chain as a part of an organoboron compound.

The third ion-conductive polymeric compound can be obtained by polymerizing a mixture of compounds represented by the following general formulas (9) and (10).

In formula (9), $R_1$ represents a divalent group having a molecular weight of at least 100, and $R_2$ in formula (10) represents a divalent group having a molecular weight of at least 150. With respect to the molecular weights of the two, preferably, that of $R_1$ is at least 100 and at most 1,700,000, and that of $R_2$ is at least 150 and at most 1,700,000.

The mixing ratio of the compounds represented by formulas (9) and (10) is 1/99 to 99/1, preferably 10/90 to 90/10 in terms of a weight ratio.

$R_1$ in formula (9) and/or $R_2$ in formula (10) is not particularly limited, but preferably a polymer or a copolymer of compound (A) represented by formula (2) and/or compound (B) represented by formula (3), most preferably a compound represented by formula (6).

In formulas (9) and (10), Y represents a polymerizable functional group. Preferable examples thereof include a (meth)acrylic residue, an allyl group and a vinyl group.

In formula (9), $R^{11}$ and $R^{12}$, which may be the same or different, each represent a hydrogen atom, a halogen atom or a monovalent group. Examples of the monovalent group include an alkyl group, an alkoxy group, an aryl group, an alkenyl group, an alkinyl group, an aralkyl group, a cycloalkyl group, a cyano group, a hydroxyl group, a formyl group, an aryloxy group, an alkylthio group, an arylthio group, an acyloxy group, a sulfonyloxy group, an amino group, an alkylamino group, an arylamino group, a carboxyamino group, an oxysulfonylamino group, a sulfonamido group, an oxycarbonylamino group, a ureido group, an acyl group, an oxycarbonyl group, a carbamoyl group a sulfonyl group, a sulfinyl group, an oxysulfonyl group, a sulfamoyl group, a carboxylic group, a sulfonic group, a phosphonic group, a heterocyclic group, —B(R$^a$) (R$^b$), —OB(R$^a$) (R$^b$) and —OSi(R$^a$)(R$^b$)(R$^c$). R$^a$, R$^b$ and R$^c$ herein each represent a hydrogen atom, a halogen atom or a monovalent group. Examples of the monovalent group include an alkyl group, an alkoxy group, an aryl group, an alkenyl group, an alkinyl group, an aralkyl group, a cycloalkyl group, a cyano group, a hydroxyl group, a formyl group, an aryloxy group, an alkylthio group, an arylthio group, an acyloxy group, a sulfonyloxy group, an amino group, an alkylamino group, an arylamino group, a carboxyamino group, an oxysulfonylamino group, a sulfonamide group, an oxycarbonylamino group, a ureido group, an acyl group, an oxycarbonyl group, a carbamoyl group, a sulfonyl group, a sulfinyl group, an oxysulfonyl group, a sulfamoyl group, a carboxylic group, a sulfonic group, a phosphonic group, a heterocyclic group and derivatives thereof. Further in formula (9), R$^{11}$ and R$^{12}$ may be bound to each other to form a ring, and this ring may have a substituent. Still further, each group may be substituted with a group which can be substituted.

R$^{11}$ and R$^{12}$ are preferably those selected from the group consisting of an alkyl group, an aryl group, derivatives thereof and fluorine-substituted derivatives thereof.

Specific examples of —BR$^{11}$R$^{12}$ are as follows.

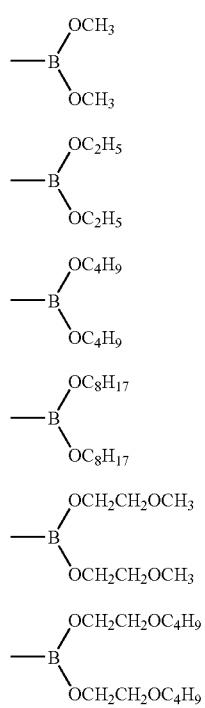

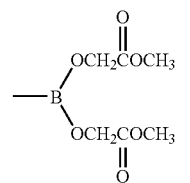

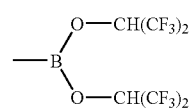

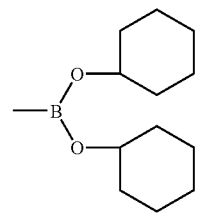

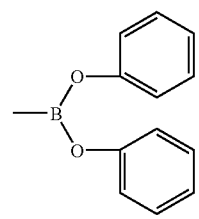

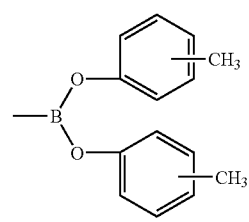

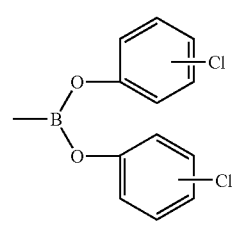

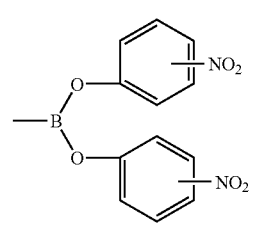

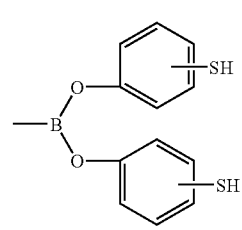

-continued
1-15 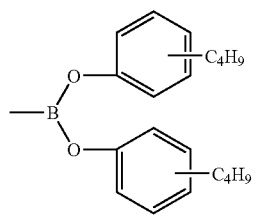
1-16 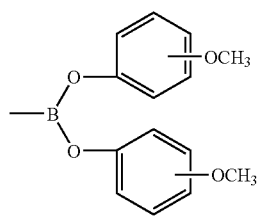
1-17 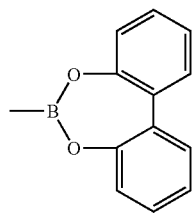
1-18 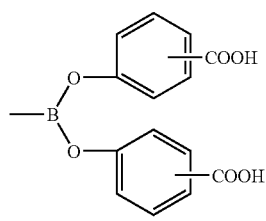
1-19 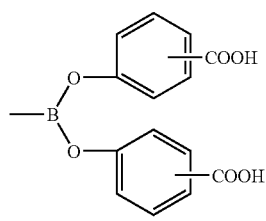
1-20 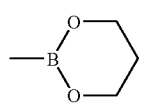
1-21 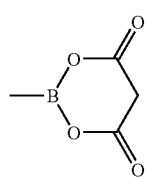
-continued
1-22 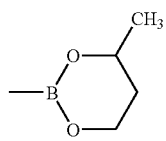
1-23 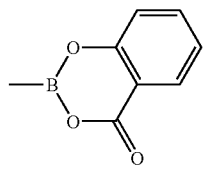
1-24 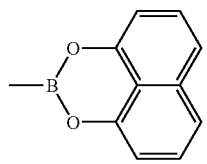
2-1 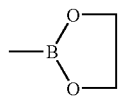
2-2 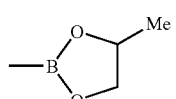
2-3 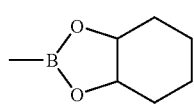
2-4 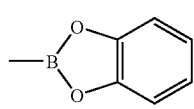
2-5 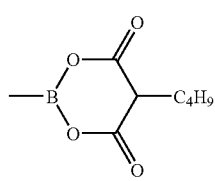
2-6 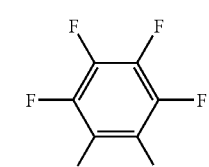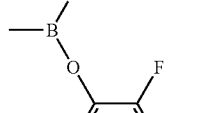

-continued 2-7
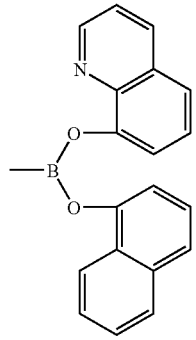

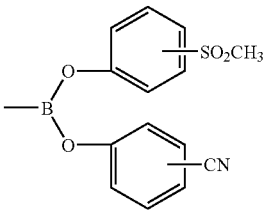
2-12

2-8
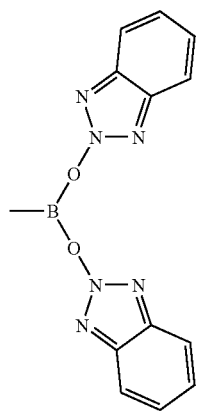

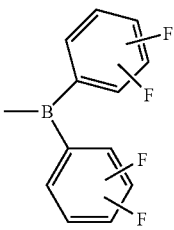
2-13

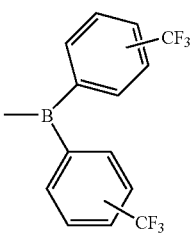
2-14

2-9
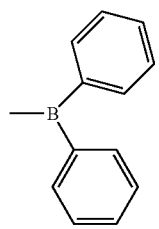

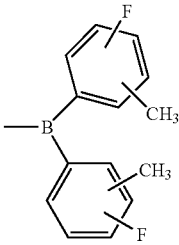
2-15

2-10
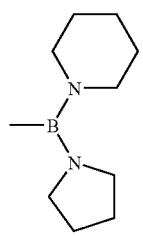

Moreover, in general formula (10), z represents a residue of an active hydrogen compound. Examples of the active hydrogen compound include ethylene glycol, glycerin, trimethylolethane, diglycerin, pentaerythritol and the like. k represents an integer of 2 to 6, preferably 2 to 4.

(4) Tetravalent Boron-containing Polymer

The tetravalent boron-containing polymer used in the invention has preferably a structural unit represented by the following general formula (11) in a molecule.

2-11
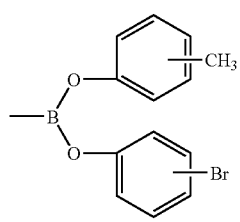

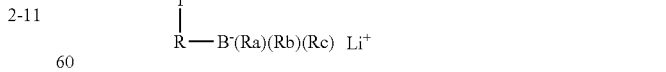
(11)

In formula (11), Y represents a residue of a polymerizable functional group, and R represents a group capable of being bound to the polymerizable functional group and the boron atom and having a molecular weight of at least 40. $R^a$, $R^b$ and $R^c$, which may be the same or different, each represent a group capable of being bound to the boron atom.

In formula (11), the residue of the polymerizable functional group represented by Y is not particularly limited. Preferable examples thereof include residues of an acryloyl group, a methacryloyl group, an allyl group, a vinyl group, a glycidyl group and the like.

In formula (11), R is not particularly limited either. It is preferably an alkyl diol residue, or a polymer or a copolymer of compound (A) represented by formula (2) and/or compound (B) represented by formula (3).

Further, in formula (11), Ra, Rb and Rc each represent a hydrogen atom, a halogen atom or a monovalent group. Examples of the monovalent group are the same as those listed on $R^{11}$ and $R^{12}$ in formula (9). Ra, Rb and Rc in formula (11) may be bound to each other to form a ring, and this ring may have a substituent. Moreover, each group may be substituted with a group which can be substituted.

It is preferable that the polymeric compound having the structural unit represented by formula (11) in the molecule further has a structural unit represented by the following formula (12) in the molecule.

$$Z + R' - Y]_k \quad (12)$$

In formula (12), Y represents a residue of a polymerizable functional group, Z represents a residue of an active hydrogen compound, R' represents a divalent group having a molecular weight of at least 150, and k represents an integer of 2 to 6.

The residue of the polymerizable functional group represented by Y in formula (12) is not particularly limited. Preferable examples thereof are those listed on Y in general formula (11).

Further, the residue of the active hydrogen compound represented by Z is not particularly limited either, and examples thereof are the same as those listed on Z in formula (10). k represents an integer of 2 to 6, preferably 2 to 4.

The divalent group represented by R' is preferably a polymer or a copolymer of compound (A) represented by formula (2) and/or compound (B) represented by formula (3), and the molecular weight is preferably at least 150 and at most 1,700,000.

Further, R' is especially preferably a group represented by formula (6).

2. Polymeric Electrolyte (1) Polymeric Electrolyte Using a Trivalent Boron-containing Polymeric Compound The first polymeric electrolyte of the invention comprises one or more of the foregoing ion-conductive polymeric compounds, and an electrolytic salt, and further, as required, a nonaqueous solvent.

The electrolytic salt used in the invention is not particularly limited. A lithium salt is preferably used. Examples thereof include $LiBF_4$, $LiPF_6$, $LiClO_4$, $LiAsF_6$, $LiCF_3SO_3$, $LiN(CF_3SO_2)_2$, $LiN(C_2F_5SO_2)_2$ $LiC(CF_3SO_2)_3$, LiCl, LiF, LiBr, LiI, derivatives thereof and the like. These lithium salts may be used either singly or in combination.

The concentration of the electrolytic salt is 0.01 mol/kg to 10 mols/kg, preferably 0.2 mol/kg to 6.0 mols/kg.

The nonaqueous solvent is preferably an aprotic solvent, and examples thereof include carbonates, lactones, ethers, sulfolanes and dioxolanes. These nonaqueous solvents may be used either singly or in combination.

The mixing ratio of the first ion-conductive polymeric compound to nonaqueous solvent is 1/99 to 99/1, preferably 30/70 to 99/1, more preferably 50/50 to 99/1 in terms of a weight ratio.

The mixing ratio of the second ion-conductive polymeric compound to nonaqueous solvent is 1/99 to 99/1, preferably 1/99 to 50/50, more preferably 1/99 to 30/70 in terms of a weight ratio.

The mixing ratio of the third ion-conductive polymeric compound to nonaqueous solvent is 1/99 to 99/1, preferably 5/95 to 95/5, more preferably 10/90 to 90/10 in terms of a weight ratio.

(2) Polymeric Electrolyte Using a Tetravalent Boron-containing Compound

The second polymeric electrolyte of the invention comprises one or more of the tetravalent boron-containing polymeric compounds as an essential component, and further, as required, an electrolytic salt and/or a solvent.

As the electrolytic salt, a lithium salt is preferable. Examples thereof are the same as those listed on the first polymeric electrolyte. The lithium salts may be used either singly or in combination.

The concentration of the electrolytic salt is preferably 10 mols/kg or less, more preferably 6.0 mols/kg or less.

The solvent is preferably an aprotic solvent, and examples thereof are also the same as those listed on the first polymeric electrolyte. The solvents may be used either singly or in combination.

The mixing ratio of the tetravalent boron-containing polymeric compound to solvent is 1/99 to 99/1, preferably 5/95 to 95/5, more preferably 10/90 to 90/10 in terms of a weight ratio.

3. Electric Devices

The polymeric electrolyte of the invention can be applied to various electric devices, and examples thereof include cells, capacitors and the like. Typical of these are cells which are obtained by linking a positive electrode and a negative electrode through any of the foregoing polymeric electrolytes.

In the positive electrode herein, a double metal oxide capable of occluding and releasing lithium ions is used. Examples thereof include cobalt lithium oxide, nickel lithium oxide, manganese lithium oxide, vanadium pentoxide and the like.

Further, in the negative electrode, a lithium metal, a lithium alloy or a substance capable of reversibly occluding and releasing lithium ions is used. Examples of such a substance include carbon and the like.

EXAMPLES

The invention is illustrated more specifically below by referring to Examples. However, the invention is not limited to these Examples.

(1) Production of Monomers A to E (Compounds (B) Represented by Formula (3))

Monomer A

Potassium hydroxide (0.01 mol) was added to 1 mol of ethylene glycol monobutyl ether as a starting material, and a vessel was purged with nitrogen while stirring the mixture. Subsequently, the pressure inside the vessel was reduced using a vacuum pump. The temperature was then raised to 120° C., and the reaction was conducted using 1 mol of ethylene oxide as a monomer. After the completion of the reaction, the reaction mixture was cooled until the temperature inside the vessel reached room temperature. A methanol solution of 1.1 mols of sodium methylate was added, and the temperature was slowly raised to 50° C. while reducing the pressure. After methanol was completely removed, 1.2 mols of epichlorohydrin was added, and the mixture was reacted for 4 hours. After the completion of the reaction, adsorption treatment was conducted. Dehydration was conducted under reduced pressure, and the residue was then filtered to obtain a desired product.

Monomer B

A desired product was obtained in the same manner as monomer A except that ethylene glycol monomethyl ether was used as a starting material and 9 mols of ethylene oxide was used as a monomer.

Monomer C

A desired product was obtained in the same manner as monomer A except that ethylene glycol monopropyl ether was used as a starting material and 2 mols of ethylene oxide was used as a monomer.

Monomer D A desired product was obtained in the same manner as monomer A except that ethylene glycol monoethyl ether was used as a starting material and 49 mols of ethylene oxide was used as a monomer.

Monomer E

A desired product was obtained in the same manner as monomer A except that ethylene glycol monomethyl ether was used as a starting material and 9 mols of ethylene oxide was used as a monomer.

(2) Examples and Comparative Examples on the First Ion-conductive Polymeric Compound

[Production of an Ion-conductive Polymeric Compound]

Compound A-1

One mol of potassium hydroxide was added to 500 g of toluene, and a vessel was purged with nitrogen while stirring the mixture. The pressure inside the vessel was reduced using a vacuum pump. The temperature was then raised to 120° C., and the reaction was conducted using 38,000 mols of ethylene oxide as a monomer. After the completion of the reaction, the reaction mixture was cooled until the temperature inside the vessel reached 60° C. The resulting mixture was neutralized with sulfuric acid until it became weakly acidic, and acid and alkali adsorption treatment was then conducted. The temperature was raised again to 120° C., and dehydration was conducted under reduced pressure. The product was then filtered to obtain a diol. The resulting diol and borane were consecutively reacted in dichloromethane at room temperature to give a desired compound.

Compound A-2

A desired compound was obtained in the same manner as compound A-1 except that 28,000 mols of propylene oxide was used as a monomer.

Compound A-3

A desired compound was obtained in the same manner as compound A-1 except that 1,500 mols of ethylene oxide and 600 mols of 1,2-epoxyhexane were used as monomers.

Compound A-4

A desired compound was obtained in the same manner as compound A-1 except that 2 mols of ethylene oxide and 1 mol of butylene oxide were used as monomers.

Compound A-5

A desired compound was obtained in the same manner as compound A-1 except that 300 mols of ethylene oxide and 20 mols of 1,2-epoxypentane were used as monomers.

Compound B-1

A desired compound was obtained in the same manner as compound A-1 except that 600 mols of monomer A was used as a monomer.

Compound B-2

A desired compound was obtained in the same manner as compound A-1 except that 50 mols of ethylene oxide and 15 mols of monomer B were used as monomers.

Compound B-3

A desired compound was obtained in the same manner as compound A-1 except that 1 mol of ethylene oxide and 1 mol of monomer C were used as monomers.

Compound B-4

A desired compound was obtained in the same manner as compound A-1 except that 1,600 mols of ethylene oxide and 400 mols of monomer D were used as monomers.

Compound B-5

A desired compound was obtained in the same manner as compound A-1 except that 10 mols of ethylene oxide and 10 mols of monomer E were used as monomers.

The structures of compounds A-1 to A-5 and B-1 to B-5 represented by general formula (5) which were obtained in the foregoing Production Examples are as shown in the following chemical formulas and tables.

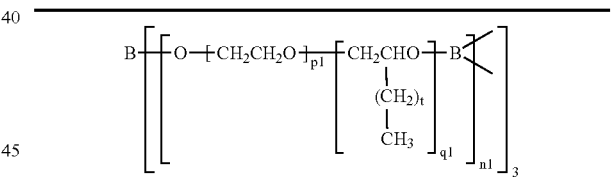

| Compound | p1 | q1 | t | n1 |
|---|---|---|---|---|
| A-1 | 38000 | 0 | 0 | 1 |
| A-2 | 0 | 28000 | 0 | 1 |
| A-3 | 1500 | 600 | 3 | 4 |
| A-4 | 2 | 1 | 1 | 13 |
| A-5 | 300 | 20 | 2 | 7 |

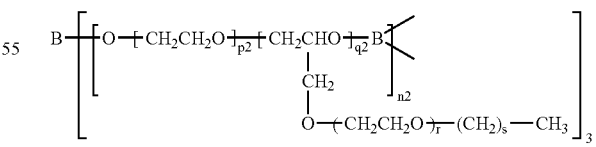

| Compound | p2 | q2 | r | s | n2 |
|---|---|---|---|---|---|
| B-1 | 0 | 600 | 2 | 3 | 4 |
| B-2 | 50 | 15 | 10 | 0 | 8 |
| B-3 | 1 | 1 | 3 | 2 | 13 |
| B-4 | 1600 | 400 | 50 | 1 | 2 |
| B-5 | 10 | 10 | 10 | 0 | 8 |

[Production of a Polymeric Electrolyte]

Example 1

One gram of compound A-1 and 1 mol/kg of LiBF$_4$ were dissolved in 2.3 g of γ-butyrolactone (GBL) at 80° C. The mixture was poured between glass plates, and then cooled to obtain a polymeric electrolyte having a thickness of 500 μm.

Example 2

One gram of compound A-2 and 0.01 mol/kg of LiBF$_6$ were dissolved in 0.2 g of acetonitrile at 80° C. The mixture was poured between glass plates, and then cooled. Acetonitrile was distilled off under reduced pressure to obtain a polymeric electrolyte having a thickness of 500 μm.

Examples 3 to 9

Polymeric electrolytes were obtained in the same manner as in Example 2 except that types and amounts of ion-conductive polymeric compounds and electrolytic salts shown in Table 1 below were used.

Examples 10 to 12

Polymeric electrolytes were obtained in the same manner as in Example 1 except that types and amounts of ion-conductive polymeric compounds, electrolytic salts and aprotic solvents shown in Table 1 below were used.

Comparative Examples 1 and 2

Polymeric electrolytes were obtained in the same manner as in Example 2 except that types and amounts of ion-conductive polymeric compounds and electrolytic salts shown in Table 1 below were used.

Comparative Example 3

Polymeric electrolytes were obtained in the same manner as in Example 2 except that polyethylene oxide (PEO) having a molecular weight of 1,000,000 was used as an ion-conductive polymeric compound and types and amounts of salts shown in Table 1 were used.

[Measurement of a Lithium Ion Transport Rate]

Each of the polymeric electrolytes obtained in the foregoing Examples and Comparative Examples was cut in a circle having a diameter of 13 mm, and this was held between lithium metal electrodes having the same diameter. A lithium ion transport rate was measured by a DC polarization method. The results are also shown in Table 1.

TABLE 1

| | Ion-conductive polymer | | Electrolytic salt and its concentration (mol/kg) | | Aprotic solvent | Lithium ion transport rate |
|---|---|---|---|---|---|---|
| Example | | | | | | |
| 1 | A-1 | 1 | LiBF$_4$ | 1 | GBL 2.3 g | 0.85 |
| 2 | A-2 | 1 | LiPF$_6$ | 0.01 | — | 0.81 |
| 3 | A-3 | 1 | LiClO$_4$ | 0.1 | — | 0.83 |
| 4 | A-4 | 1 | LiAsF$_6$ | 10 | — | 0.75 |
| 5 | A-5 | 1 | LiCF$_3$SO$_3$ | 5 | — | 0.82 |
| 6 | B-1 | 1 | LiN(CF$_3$SO$_2$)$_2$ | 0.05 | — | 0.85 |
| 7 | B-2 | 1 | LiN(C$_2$F$_5$SO$_2$)$_2$ | 2 | — | 0.84 |
| 8 | B-3 | 1 | LiC(CF$_3$SO$_2$)$_3$ | 8 | — | 0.78 |
| 9 | B-4 | 1 | LiCl | 0.5 | — | 0.80 |
| 10 | B-5 | 1 | LiF | 3 | EC 0.5 g, DO 0.5 g | 0.82 |
| 11 | A-3 | 1 | LiBr | 0.3 | EC 0.5 g, SL 0.5 g | 0.80 |
| 12 | B-2 | 1 | LiI | 6 | EC 0.5 g, DME 0.5 g | 0.81 |
| Comparative Example | | | | | | |
| 1 | A-5 | 1 | LiN(CF$_3$SO$_2$)$_2$ | 0.001 | — | 0.60 |
| 2 | B-1 | 1 | LiCl | 15 | — | unmeasurable |
| 3 | PEO | 1 | LiBF$_4$ | 1 | — | 0.08 |

*EC: ethylene carbonate, GBL: γ-butyrolactone, DO: 1,3-dioxolane, DME: 1,2-dimethoxyethane, SL: sulfolane (3) Examples and Comparative Examples on the Second Ion-conductive Polymeric Compound

[Production of a Compound Represented by General Formula (8)]

Compound A-1

One mol of potassium hydroxide was added to 500 g of toluene, and a vessel was purged with nitrogen while stirring the mixture. The pressure inside the vessel was reduced using a vacuum pump. The temperature was raised to 120° C., and the reaction was conducted using 38,000 mols of ethylene oxide as a monomer. After the completion of the reaction, the reaction mixture was cooled until the temperature inside the vessel reached room temperature. A methanol solution of 1.1 mols of sodium methylate was added, and the temperature was slowly raised while reducing the pressure. After methanol was completely removed and the reaction mixture was allowed to cool, 1 kg of toluene was added, 1 mol of acrylic acid chloride was added, and the reaction was conducted for 4 hours. After acid and alkali adsorption treatment was conducted, the product was filtered, and toluene was removed under reduced pressure to obtain a mono-ol having a polymerizable functional group. Three mols of the resulting mono-ol and 1 mol of borane were reacted in dichloromethane at room temperature to obtain a desired compound.

Compound A-2

A desired compound was obtained in the same manner as compound A-1 except that 28,000 mols of propylene oxide was used as a monomer and methacrylic acid chloride was used instead of acrylic acid chloride.

Compound A-3

A desired compound was obtained in the same manner as compound A-1 except that 1,500 mols of ethylene oxide and 600 mols of 1,2-epoxyhexane were used as monomers and allyl chloride was used instead of acrylic acid chloride.

Compound A-4

A desired compound was obtained in the same manner as compound A-1 except that 2 mols of ethylene oxide and 1 mol of butylene oxide were used as monomers and vinyl chloride was used instead of acrylic acid chloride.

Compound A-5

A desired compound was obtained in the same manner as compound A-1 except that 300 mols of ethylene oxide and 20 mols of 1,2-epoxypentane were used as monomers.

Compound B-1

A desired compound was obtained in the same manner as compound A-1 except that 600 mols of monomer A was used as a monomer.

Compound B-2

A desired compound was obtained in the same manner as compound A-2 except that 50 mols of ethylene oxide and 15 mols of monomer B were used as monomers.

Compound B-3

A desired compound was obtained in the same manner as compound A-3 except that 1 mol of ethylene oxide and 1 mol of monomer C were used as monomers.

Compound B-4

A desired compound was obtained in the same manner as compound A-4 except that 1,600 mols of ethylene oxide and 400 mols of monomer D were used as monomers.

Compound B-5

A desired compound was obtained in the same manner as compound A-5 except that 10 mols of ethylene oxide and 10 mols of monomer E were used as monomers.

The structures of compounds A-1 to A-5 and B-1 to B-5 represented by formula (8), which were obtained as mentioned above, are as shown in the following chemical formulas and tables.

$$B \left[ O + CH_2CH_2O \right]_{p1} \left[ \begin{array}{c} CH_2CHO \\ | \\ (CH_2)_m \\ | \\ CH_3 \end{array} \right]_{q1} Y \right]_3$$

| Compound | p1 | q1 | m | Y |
|---|---|---|---|---|
| A-1 | 38000 | 0 | 0 | acryloyl group |
| A-2 | 0 | 28000 | 0 | methacryloyl group |
| A-3 | 1500 | 600 | 3 | allyl group |
| A-4 | 2 | 1 | 1 | vinyl group |
| A-5 | 300 | 20 | 2 | acryloyl group |

-continued $$B \left[ O + CH_2CH_2O \right]_{p2} \left[ \begin{array}{c} CH_2CHO \\ | \\ CH_2 \\ | \\ O + CH_2CH_2O \right]_{r} - (CH_2)_n - CH_3 \end{array} \right]_{q2} Y \right]_3$$

| Compound | p2 | q2 | r | n | Y |
|---|---|---|---|---|---|
| B-1 | 0 | 600 | 2 | 3 | acryloyl group |
| B-2 | 50 | 15 | 10 | 0 | methacryloyl group |
| B-3 | 1 | 1 | 3 | 2 | allyl group |
| B-4 | 1600 | 400 | 50 | 1 | vinyl group |
| B-5 | 10 | 10 | 10 | 0 | acryloyl group |

[Production of a Polymeric Electrolyte]

Example 1

One gram of compound A-1, 1 mol/kg of $LiBF_4$ and 0.01 g of azoisobutyronitrile (AIBN) were dissolved in 2.3 g of γ-butyrolactone at 40° C. The mixture was poured between glass plates, and allowed to stand at 80° C. for 2 hours to obtain a polymeric electrolyte having a thickness of 500 μm.

Example 2

One gram of compound A-2, 0.01 mol/kg of $LiPF_6$ and 0.01 g of AIBN were dissolved in 0.2 g of acetonitrile at 40° C. The mixture was poured between glass plates, and allowed to stand at 80° C. for 2 hours. Acetonitrile was then distilled off under reduced pressure to obtain a polymeric electrolyte having a thickness of 500 μm.

Examples 3 to 9

Polymeric electrolytes were obtained in the same manner as in Example 2 except that types and amounts of compounds represented by general formula (8) and electrolytic salts, shown in Table 2 below were used.

Examples 10 to 12

Polymeric electrolytes were obtained in the same manner as in Example 1 except that types and amounts of compounds represented by general formula (8), electrolytic salts and aprotic solvents, shown in Table 2 below were used.

Comparative Examples 1 and 2

Polymeric electrolytes were obtained in the same manner as in Example 2 except that types and amounts of compounds represented by general formula (8) and electrolytic salts, shown in Table 2 below were used.

Comparative Example 3

One gram of polyethylene oxide (PEO) having a molecular weight of 1,000,000 and 1 mol/kg of $LiBF_4$ were dissolved in 0.2 g of acetonitrile at 40° C., and the mixture was poured between glass plates. Acetonitrile was then distilled off under reduced pressure to obtain a polymeric electrolyte having a thickness of 500 μm.

[Measurement of a Lithium Ion Transport Rate]

Each of the polymeric electrolytes obtained in the foregoing Examples and Comparative Examples was cut in a circle having a diameter of 13 mm, and this was held between lithium metal electrodes having the same diameter. A lithium ion transport rate was measured by a DC polarization method. The results are also shown in Table 2.

TABLE 2

| | Compound | | Electrolytic salt and its concentration (mol/kg) | | Aprotic solvent | Lithium ion transport rate |
|---|---|---|---|---|---|---|
| Example | | | | | | |
| 1 | A-1 | 1 | LiBF$_4$ | 1 | GBL 2.3 g | 0.84 |
| 2 | A-2 | 1 | LiPF$_6$ | 0.01 | — | 0.82 |
| 3 | A-3 | 1 | LiClO$_4$ | 0.1 | — | 0.82 |
| 4 | A-4 | 1 | LiAsF$_6$ | 10 | — | 0.76 |
| 5 | A-5 | 1 | LiCF$_3$SO$_3$ | 5 | — | 0.83 |
| 6 | B-1 | 1 | LiN(CF$_3$SO$_2$)$_2$ | 0.05 | — | 0.84 |
| 7 | B-2 | 1 | LiN(C$_2$F$_5$SO$_2$)$_2$ | 2 | — | 0.85 |
| 8 | B-3 | 1 | LiC(CF$_3$SO$_2$)$_3$ | 8 | — | 0.77 |
| 9 | B-4 | 1 | LiCl | 0.5 | — | 0.81 |
| 10 | B-5 | 1 | LiF | 3 | EC 0.5 g, DO 0.5 g | 0.83 |
| 11 | A-3 | 1 | LiBr | 0.3 | EC 0.5 g, SL 0.5 g | 0.79 |
| 12 | B-2 | 1 | LiI | 6 | EC 0.5 g, DME 0.5 g | 0.82 |
| Comparative Example | | | | | | |
| 1 | A-1 | 1 | LiN(CF$_3$SO$_2$)$_2$ | 0.001 | — | 0.59 |
| 2 | B-1 | 1 | LiCl | 15 | — | unmeasurable |
| 3 | PEO | 1 | LiBF$_4$ | 1 | — | 0.08 |

*EC: ethylene carbonate, GBL: γ-butyrolactone, DO: 1,3-dioxolane, DME: 1,2-dimethoxyethane, SL: sulfolane (4) Examples and Comparative Examples on the Third Ion-conductive Polymeric Compound

[Production of a Compound Represented by General Formula (9)]

Compound A-1

One mol of potassium hydroxide was added to 500 g of toluene, and a vessel was purged with nitrogen while stirring the mixture. The pressure inside the vessel was reduced using a vacuum pump. The temperature was raised to 120° C., and the reaction was conducted using 220 mols of ethylene oxide as a monomer. After the completion of the reaction, the reaction mixture was cooled until the temperature inside the vessel reached room temperature. A methanol solution of 1.1 mols of sodium methylate was added, and the temperature was slowly raised to 50° C. while reducing the pressure. After methanol was completely removed, the reaction mixture was allowed to cool. One kilogram of toluene was added, 1 mol of acrylic acid chloride was added, and the reaction was conducted for 4 hours. After acid and alkali adsorption treatment was conducted, the product was filtered, and toluene was removed under reduced pressure to obtain a mono-ol having a polymerizable functional group. One mol of the resulting mono-ol, 2 mols of methanol and 1 mol of borane were reacted in dichloromethane at room temperature to obtain a desired compound.

Compound A-2

A mono-ol having a polymerizable functional group was prepared in the same manner as in compound A-1 except that 240 mols of propylene oxide was used as a monomer and methacrylic acid chloride was used instead of acrylic acid chloride. One mol of the resulting mono-ol, 2 mols of octanol and 1 mol of borane were reacted in dichloromethane at room temperature to obtain a desired compound.

Compound A-3

A mono-ol having a polymerizable functional group was prepared in the same manner as in compound A-1 except that 30 mols of ethylene oxide and 8 mols of 1,2-epoxyhexane were used as monomers and allyl chloride was used instead of acrylic acid chloride. One mol of the resulting mono-ol, 1 mol of biphenyl-2,2'-diol and 1 mol of borane were reacted in dichloromethane at room temperature to obtain a desired compound.

Compound A-4

A mono-ol having a polymerizable functional group was prepared in the same manner as in compound A-1 except that 3 mols of ethylene oxide was used as a monomer and vinyl chloride was used instead of acrylic acid chloride. One mol of the resulting mono-ol, 1 mol of catechol and 1 mol of borane were reacted in dichloromethane at room temperature to obtain a desired compound.

Compound A-5

A mono-ol having a polymerizable functional group was prepared in the same manner as in compound A-1 except that 15 mols of ethylene oxide and 4 mols of 1,2-epoxypentane were used as monomers. One mol of the resulting mono-ol, 2 mols of 3,4-difluorobromobenzene and 1 mol of borane were reacted in dichloromethane at room temperature to obtain a desired compound.

Compound A-6

A mono-ol having a polymerizable functional group was prepared in the same manner as in compound A-1 except that 240 mols of monomer A was used as a monomer. One mol of the resulting mono-ol, 2 mols of ethylene glycol monomethyl ether and 1 mol of borane were reacted in dichloromethane at room temperature to obtain a desired compound.

Compound A-7

A mono-ol having a polymerizable functional group was prepared in the same manner as in compound A-2 except that 15 mols of ethylene oxide and 5 mols of monomer B were used as monomers. One mol of the resulting mono-ol, 2 mols of phenol and 1 mol of borane were reacted in dichloromethane at room temperature to obtain a desired compound.

Compound A-8

A mono-ol having a polymerizable functional group was prepared in the same manner as in compound A-3 except that 1 mol of ethylene oxide and 1 mol of monomer C were used as monomers. One mol of the resulting mono-ol, 2 mols of p-nitrophenol and 1 mol of borane were reacted in dichloromethane at room temperature to obtain a desired compound.

Compound A-9

A mono-ol having a polymerizable functional group was prepared in the same manner as in compound A-4 except that 10 mols of ethylene oxide and 3 mols of monomer D were used as monomers. One mol of the resulting mono-ol, 1 mol of 1,8-dinaphthol and 1 mol of borane were reacted in dichloromethane at room temperature to obtain a desired compound.

Compound A-10

A mono-ol having a polymerizable functional group was prepared in the same manner as in compound A-5 except that 10 mols of ethylene oxide and 2 mols of monomer E were used as monomers. One mol of the resulting mono-ol, 2 mols of bromobenzene and 1 mol of borane were reacted in dichloromethane at room temperature to obtain a desired compound.

[Production of a Compound Represented by General Formula (10)]

Compound B-1

Potassium hydroxide (0.01 mol) was added to 0.5 mol of ethylene glycol as a starting material, and a vessel was purged with nitrogen while stirring the mixture. The pressure inside the vessel was reduced using a vacuum pump. The temperature was then raised to 120° C., and the reaction was conducted using 38,000 mols of ethylene oxide as a monomer. After the completion of the reaction, the reaction mixture was cooled until the temperature inside the vessel reached room temperature. A methanol solution of 1.1 mols of sodium methylate was added, and the temperature was slowly raised to 50° C. while reducing the pressure. After methanol was completely removed, the reaction mixture was allowed to cool. One kilogram of toluene was added, 1 mol of acrylic acid chloride was added, and the reaction was conducted for 4 hours. After acid and alkali adsorption treatment was conducted, the product was filtered, and toluene was removed under reduced pressure to obtain a desired compound.

Compound B-2

A desired compound was obtained in the same manner as compound B-1 except that 0.33 mol of glycerin was used as a starting material, 28,000 mols of propylene oxide was used as a monomer and methacrylic acid chloride was used instead of acrylic acid chloride.

Compound B-3

A desired compound was obtained in the same manner as compound B-1 except that 0.25 mol of diglycerin was used as a starting material, 150 mols of ethylene oxide and 600 mols of 1,2-epoxyhexane were used as monomers and allyl chloride was used instead of acrylic acid chloride.

Compound B-4

A desired compound was obtained in the same manner as compound B-1 except that 0.5 mol of ethylene glycol was used as a starting material, 2 mols of ethylene oxide and 1 mol of butylene oxide were used as monomers and vinyl chloride was used instead of acrylic acid chloride.

Compound B-5

A desired compound was obtained in the same manner as compound B-1 except that 0.33 mol of glycerin was used as a starting material and 300 mols of ethylene oxide and 20 mols of 1,2-epoxypentane were used as monomers.

Compound B-6

A desired compound was obtained in the same manner as compound B-1 except that 600 mols of monomer A was used as a monomer.

Compound B-7

A desired compound was obtained in the same manner as compound B-2 except that 50 mols of ethylene oxide and 15 mols of monomer B were used as monomers.

Compound B-8

A desired compound was obtained in the same manner as compound B-3 except that 1 mol of ethylene oxide and 1 mol of monomer C were used as monomers.

Compound B-9

A desired compound was obtained in the same manner as compound B-4 except that 1,600 mols of ethylene oxide and 400 mols of monomer D were used as monomers.

Compound B-10

A desired compound was obtained in the same manner as compound B-5 except that 10 mols of ethylene oxide and 10 mols of monomer E were used as monomers.

The structures of compounds A-1 to A-10 represented by general formula (9) and compounds B-1 to B-10 represented by formula (10), which were obtained as mentioned above, are as shown in the following chemical formulas and tables.

$$Y\text{---}[CH_2CH_2O]_{p1}\text{---}[CH_2CHO(\!(CH_2)_s\!CH_3)]_{q1}\text{---}B\!\begin{subarray}{l}R^{11}\\R^{12}\end{subarray}$$

| Compound | p1 | q1 | s | Y | $B(R^{11})(R^{12})$ |
|---|---|---|---|---|---|
| A-1 | 220 | 0 | 0 | acryloyl group | 1-1 |
| A-2 | 0 | 240 | 1 | methacryloyl group | 1-4 |
| A-3 | 30 | 8 | 3 | allyl group | 1-17 |
| A-4 | 3 | 0 | 0 | vinyl group | 2-4 |
| A-5 | 15 | 4 | 2 | acryloyl group | 2-13 |

1-1

$$\text{---}B\!\begin{subarray}{l}OCH_3\\OCH_3\end{subarray}$$

1-4

$$\text{---}B\!\begin{subarray}{l}OC_8H_{17}\\OC_8H_{17}\end{subarray}$$

1-17

-continued

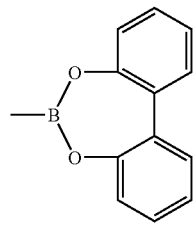
2-4

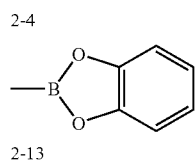
2-13

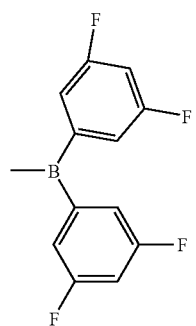

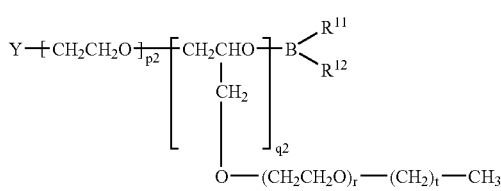

| Compound | p2 | q2 | r | t | Y | B(R^{11})(R^{12}) |
|---|---|---|---|---|---|---|
| A-6 | 0 | 240 | 2 | 3 | acryloyl group | 1-5 |
| A-7 | 15 | 5 | 10 | 0 | methacryloyl group | 1-10 |
| A-8 | 1 | 1 | 3 | 2 | allyl group | 1-13 |
| A-9 | 10 | 3 | 50 | 1 | vinyl group | 1-24 |
| A-10 | 10 | 2 | 10 | 0 | acryloyl group | 2-9 |

1-5

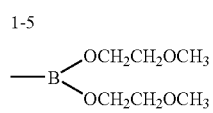
1-10

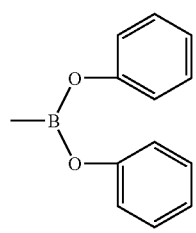
1-13

-continued

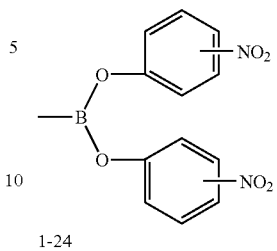
1-24

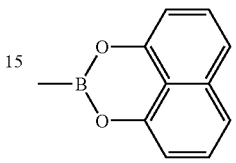
2-9

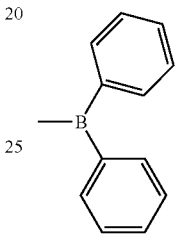

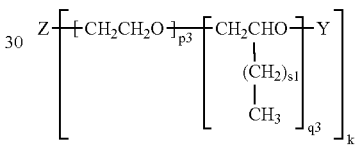

Z represents a residue of an active hydrogen compound.

| Compound | p3 | q3 | s1 | Y | k |
|---|---|---|---|---|---|
| B-1 | 38000 | 0 | 0 | acryloyl group | 2 |
| B-2 | 0 | 28000 | 1 | methacryloyl group | 3 |
| B-3 | 150 | 600 | 3 | allyl group | 4 |
| B-4 | 2 | 1 | 1 | vinyl group | 2 |
| B-5 | 300 | 20 | 2 | acryloyl group | 3 |

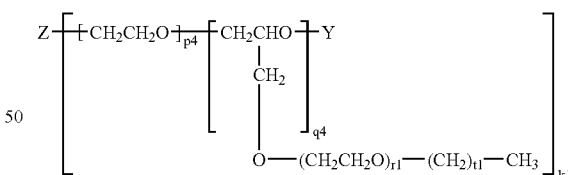

Z represents a residue of an active hydrogen compound.

| Compound | p4 | q4 | r1 | t1 | Y | k1 |
|---|---|---|---|---|---|---|
| B-6 | 0 | 600 | 2 | 3 | acryloyl group | 2 |
| B-7 | 50 | 15 | 10 | 0 | methacryloyl group | 3 |
| B-8 | 1 | 1 | 3 | 2 | allyl group | 4 |
| B-9 | 1600 | 400 | 50 | 1 | vinyl group | 2 |
| B-10 | 10 | 10 | 10 | 0 | acryloyl group | 3 |

More specific structures of compounds B-1 to B-10 represented by general formula (10) are as follows.

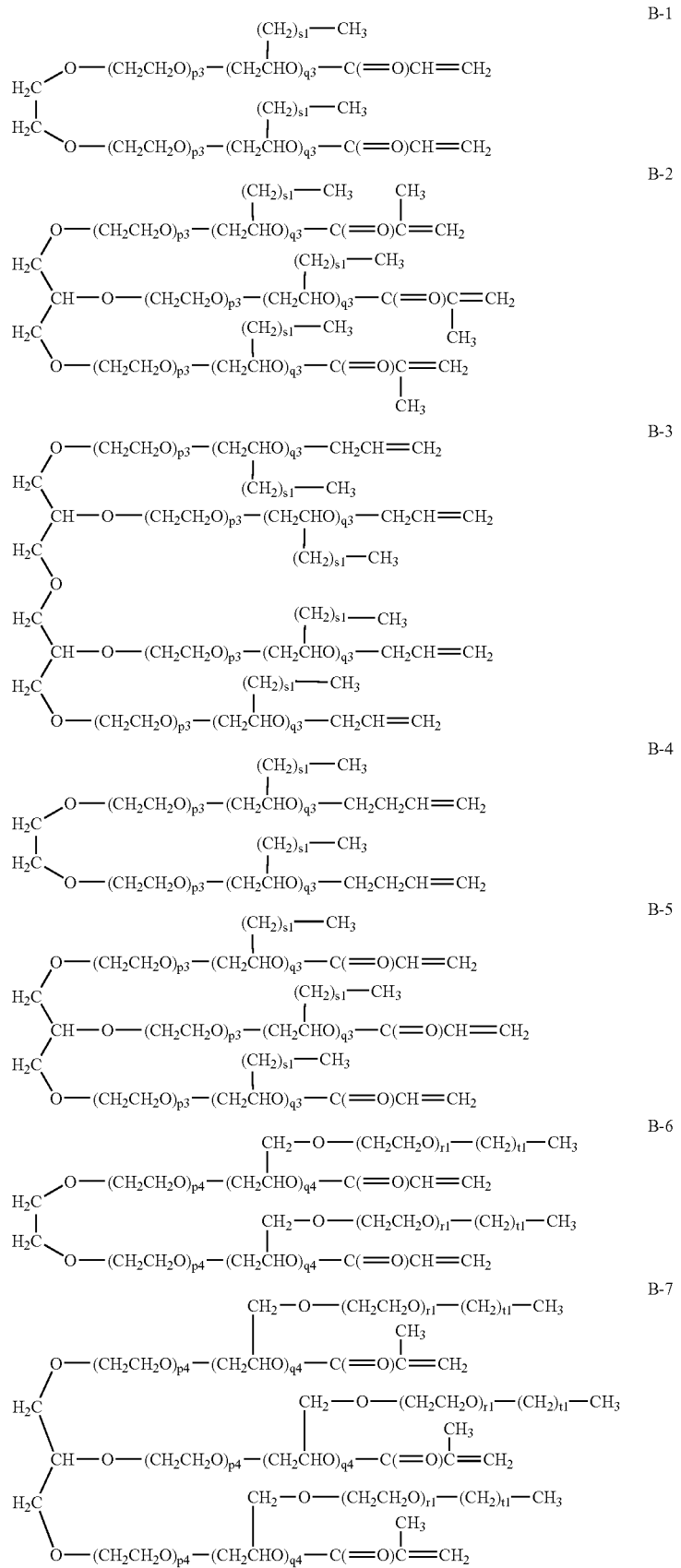

-continued

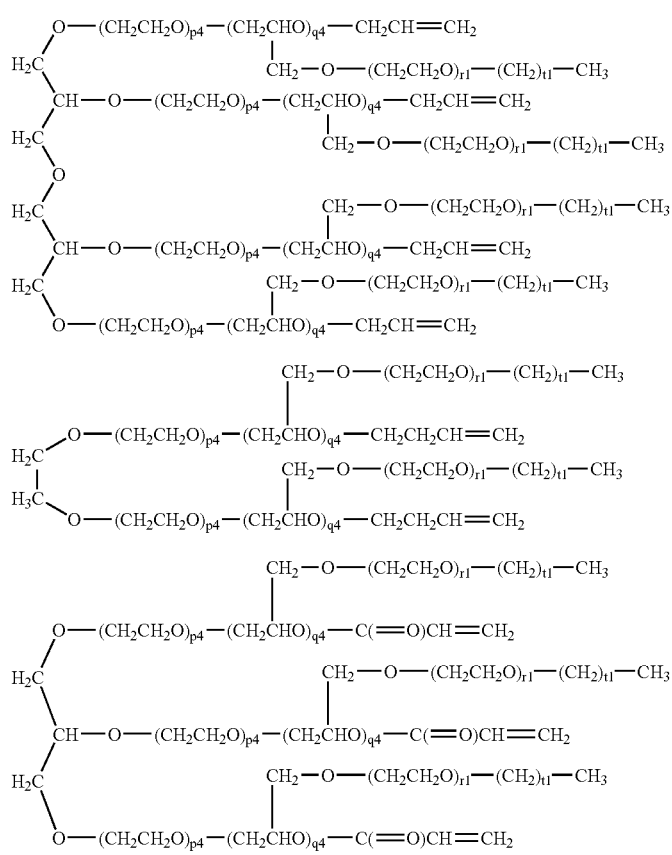

[Production of a Polymeric Electrolyte]

Example 1

One gram of compound A-1, 9 g of B-10, 1 mol/kg of $LiBF_4$ and 0.01 g of azoisobutyronitrile (AIBN) were dissolved in 1.2 g of γ-butyrolactone at 40° C. The mixture was poured between glass plates, and allowed to stand at 80° C. for 2 hours to obtain a polymeric electrolyte having a thickness of 500 μm.

Example 2

Two grams of compound A-2, 8 g of B-8, 0.01 mol/kg of $LiPF_6$ and 0.01 g of AIBN were dissolved in 0.2 g of acetonitrile at 40° C. The mixture was poured between glass plates, and allowed to stand at 80° C. for 2 hours. Acetonitrile was then distilled off under reduced pressure to obtain a polymeric electrolyte having a thickness of 500 μm.

Examples 3 to 9

Polymeric electrolytes were obtained in the same manner as in Example 2 except that types and amounts of compounds represented by general formula (9) or (10) and electrolytic salts, shown in Table 3 below were used.

Examples 10 to 12

Polymeric electrolytes were obtained in the same manner as in Example 1 except that types and amounts of compounds represented by general formula (9) or (10), electrolytic salts and aprotic solvents, shown in Table 3 below were used.

Comparative Examples 1 and 2

Polymeric electrolytes were obtained in the same manner as in Example 2 except that types and amounts of compounds represented by general formula (9) or (10) and electrolytic salts, shown in Table 3 below were used.

Comparative Example 3

One gram of polyethylene oxide (PEO) having a molecular weight of 1,000,000 and 1 mol/kg of $LiBF_4$ were dissolved in 0.2 g of acetonitrile at 40° C., and the mixture was poured between glass plates. Acetonitrile was then distilled off under reduced pressure to obtain a polymeric electrolyte having a thickness of 500 μm.

[Measurement of a Lithium Ion Transport Rate]

Each of the polymeric electrolytes obtained in the foregoing Examples and Comparative Examples was cut in a circle having a diameter of 13 mm, and this was held between lithium metal electrodes having the same diameter. A lithium ion transport rate was measured by a DC polarization method. The results are also shown in Table 3.

TABLE 3

| | Compound | | Electrolytic salt and its concentration | (mol/kg) | Aprotic solvent | Lithium ion transport rate |
|---|---|---|---|---|---|---|
| Example | | | | | | |
| 1 | A-1 1 g | B-10 9 g | LiBF$_4$ | 1 | GBL 1.2 g | 0.86 |
| 2 | A-2 2 g | B-8 8 g | LiPF$_6$ | 0.01 | — | 0.84 |
| 3 | A-3 3 g | B-3 7 g | LiClO$_4$ | 0.1 | — | 0.84 |
| 4 | A-4 4 g | B-2 6 g | LiAsF$_6$ | 10 | — | 0.82 |
| 5 | A-5 5 g | B-9 5 g | LiCF$_3$SO$_3$ | 5 | — | 0.83 |
| 6 | A-6 6 g | B-9 4 g | LiN(CF$_3$SO$_2$)$_2$ | 0.05 | — | 0.86 |
| 7 | A-7 7 g | B-5 3 g | LiN(C$_2$F$_5$SO$_2$)$_2$ | 2 | — | 0.84 |
| 8 | A-8 8 g | B-1 2 g | LiC(CF$_3$SO$_2$)$_3$ | 8 | — | 0.79 |
| 9 | A-9 9 g | B-7 1 g | LiCl | 0.5 | — | 0.77 |
| 10 | A-10 1 g | B-6 7 g | LiF | 3 | EC 1.5 g, DO 2.5 g | 0.83 |
| 11 | A-3 1 g | B-3 6 g | LiBr | 0.3 | EC 0.5 g, SL 0.5 g | 0.81 |
| 12 | A-2 1 g | B-7 5 g | LiI | 6 | EC 27 g, DME 27 g | 0.79 |
| Comparative Example | | | | | | |
| 1 | A-1 1 g | B-7 10 g | LiN (CF$_3$SO$_2$)$_2$ | 0.01 | — | 0.60 |
| 2 | A-1 10 g | B-5 1 g | LiCl | 15 | — | unmeasurable |
| 3 | | PEO 1 g | LiBF$_4$ | 1 | — | 0.08 |

*EC: ethylene carbonate, GBL: γ-butyrolactone, DO: 1,3-dioxolane, DME: 1,2-dimethoxyethane, SL: sulfolane (5) Examples and Comparative Examples on a Tetravalent Boron-containing Polymeric Compound

[Production of a Polymeric Compound Precursor]

Compound A-1

Two mols of 1,4-butanediol, 2 mols of acrylic acid, 0.1 ml of sulfuric acid and 0.001 mol of hydroquinone were dissolved in 100 mol of toluene, and the solution was refluxed for 4 hours while removing water generated. After the completion of the reaction, the solvent was distilled off under reduced pressure, and the residue was purified through silica gel column chromatography using acetone as an eluent to obtain 4-hydroxybutyl acrylate. One mol of 4-hydroxybutyl acrylate obtained, 1 mol of catechol and 1 mol of borane were reacted in dichloromethane at room temperature, and 1 mol of LiBr was further added and dissolved to obtain a desired compound.

Compound A-2

8-Hydroxyoctyl acrylate was obtained using 1,8-octanediol instead of 1,4-butanediol. One mol of 8-hydroxyoctyl acrylate obtained, 1 mol of salicylic acid and 1 mol of borane were reacted in dichloromethane at room temperature, and 1 mol of MeOLi was further added and dissolved to obtain a desired compound.

Compound A-3

One mol of potassium hydroxide was added to 500 g of toluene, and a vessel was purged with nitrogen while stirring the mixture. The pressure inside the vessel was reduced using a vacuum pump. The temperature was raised to 120° C., and the reaction was conducted using 220 mols of ethylene oxide as a monomer. After the completion of the reaction, the reaction mixture was cooled until the temperature inside the vessel reached room temperature. A methanol solution of 1.1 mols of sodium methylate was added, and the temperature was slowly raised to 50° C. while reducing the pressure. After methanol was completely removed, the reaction mixture was allowed to cool, 1 kg of toluene was added, 1 mol of acrylic acid chloride was added, and the reaction was conducted for 4 hours. After acid and alkali adsorption treatment was conducted, the product was filtered, and toluene was removed under reduced pressure to obtain a mono-ol having a polymerizable functional group. One mol of the resulting mono-ol, 1 mol of 2,3-naphthalenediol and 1 mol of borane were reacted in dichloromethane at room temperature, and 1 mol of LiCl was further added and dissolved to obtain a desired compound.

Compound A-4

A mono-ol having a polymerizable functional group was prepared in the same manner as in compound A-1 except that 240 mols of propylene oxide was used as a monomer and methacrylic acid chloride was used instead of acrylic acid chloride. One mol of the resulting mono-ol, 1 mol of biphenyl-2,2'-diol and 1 mol of borane were reacted in dichloromethane at room temperature, and 1 mol of LiBr was further added and dissolved to obtain a desired compound.

Compound A-5

A mono-ol having a polymerizable functional group was prepared in the same manner as in compound A-1 except that 30 mols of ethylene oxide and 8 mols of 1,2-epoxyhexane were used as monomers and allyl chloride was used instead of acrylic acid chloride. One mol of the resulting mono-ol, 1 mol of malonic acid and 1 mol of borane were reacted in dichloromethane at room temperature, and 1 mol of LiI was further added and dissolved to obtain a desired compound.

Compound A-6

A mono-ol having a polymerizable functional group was prepared in the same manner as in compound A-1 except that 4 mols of ethylene oxide was used as a monomer and allyl chloride was used instead of acrylic acid chloride. One mol of the resulting mono-ol and t-BuOLi were dissolved in ethylene glycol dimethyl ether at 40° C., and a product obtained by reacting 3 mols of fluorophenol and 1 mol of borane in dichloromethane at room temperature was added to obtain a desired compound.

Compound A-7

A mono-ol having a polymerizable functional group was prepared in the same manner as in compound A-3 except that 240 mols of monomer A was used as a monomer. One mol of the resulting mono-ol and t-BuOLi were dissolved in ethylene glycol dimethyl ether at 40° C., and a product obtained by reacting 3 mols of 1,1,1-trifluoroethanol and 1 mol of borane in dichloromethane at room temperature was added to obtain a desired compound.

Compound A-8

A mono-ol having a polymerizable functional group was prepared in the same manner as in compound A-4 except that 15 mols of ethylene oxide and 5 mols of monomer B were used as monomers. One mol of the resulting mono-ol and t-BuOLi were dissolved in ethylene glycol dimethyl ether at 40° C., and a product obtained by reacting 3 mols of hexafluorophenol and 1 mol of trichloroborane in dichloromethane at room temperature was added to obtain a desired compound.

Compound A-9

A mono-ol having a polymerizable functional group was prepared in the same manner as in compound A-5 except that 1 mol of ethylene oxide and 1 mol of monomer C were used as monomers. One mol of the resulting mono-ol and t-BuOLi were dissolved in ethylene glycol dimethyl ether at 40° C., and a product obtained by reacting 3 mols of 1,1,1,3,3,3-hexafluoro-2-propanol and 1 mol of borane in dichloromethane at room temperature was added to obtain a desired compound.

Compound A-10

A mono-ol having a polymerizable functional group was prepared in the same manner as in compound A-4 except that 10 mols of ethylene oxide and 2 mols of monomer E were used as monomers. One mol of the resulting mono-ol and t-BuOLi were dissolved in ethylene glycol dimethyl ether at 40° C., and a product obtained by reacting 3 mols of 2-trifluoromethyl-1,1,1,3,3,3-hexafluoro-2-propanol and 1 mol of borane in dichloromethane at room temperature was added to obtain a desired compound.

The structures of compounds A-1 to A-10 obtained as mentioned above are as shown in the following chemical formulas and tables.

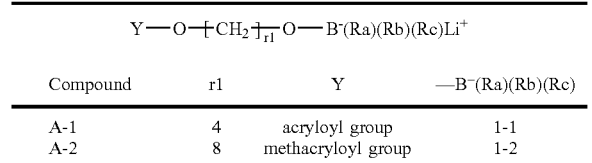

| Compound | r1 | Y | —B⁻(Ra)(Rb)(Rc) |
|---|---|---|---|
| A-1 | 4 | acryloyl group | 1-1 |
| A-2 | 8 | methacryloyl group | 1-2 |

1-1
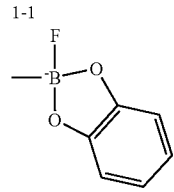

1-2
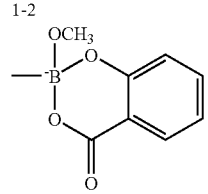

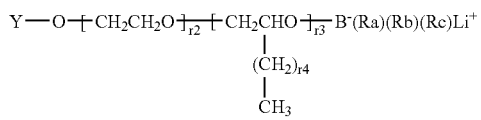

| Compound | r2 | r3 | r4 | Y | —B⁻(Ra)(Rb)(Rc) |
|---|---|---|---|---|---|
| A-3 | 220 | 0 | 0 | acryloyl group | 1-3 |
| A-4 | 0 | 240 | 1 | methacryloyl group | 1-4 |
| A-5 | 30 | 8 | 3 | allyl group | 1-5 |
| A-6 | 4 | 0 | 0 | vinyl group | 1-6 |

1-3
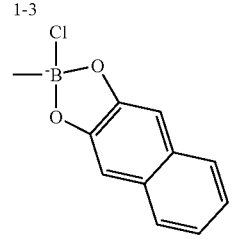

1-4
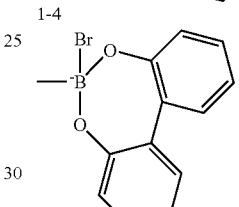

1-5
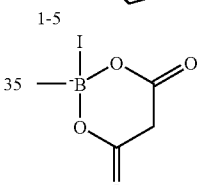

1-6
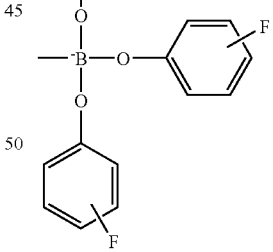

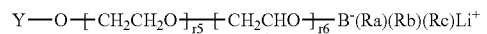
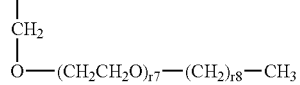

| Compound | r5 | r6 | r7 | r8 | Y | —B⁻(Ra)(Rb)(Rc) |
|---|---|---|---|---|---|---|
| A-7 | 0 | 240 | 2 | 3 | acryloyl group | 1-7 |
| A-8 | 15 | 5 | 10 | 0 | methacryloyl group | 1-8 |
| A-9 | 1 | 1 | 3 | 2 | allyl group | 1-9 |
| A-10 | 10 | 2 | 10 | 0 | vinyl group | 1-10 |

-continued

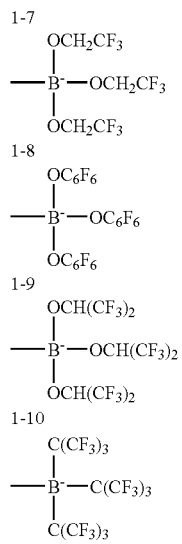

1-7 B⁻(OCH₂CF₃)₃
1-8 B⁻(OC₆F₆)₃
1-9 B⁻(OCH(CF₃)₂)₃
1-10 B⁻(C(CF₃)₃)₃

[Production of a Polymeric Electrolyte]

A polymeric electrolyte made of a polymeric compound having a structural unit represented by formula (11) or formula (12) was produced as shown below using each of compounds A-1 to A-10 and compounds B-1 to B-10 obtained by the method described in [Production of a compound represented by general formula (10)] described above.

Example 1

One gram of compound A-1, 9 g of B-10, 1 mol/kg of LiBF$_4$ and 0.01 g of azoisobutyronitrile (AIBN) were dissolved in 1.2 g of γ-butyrolactone at 40° C. The mixture was poured between glass plates, and then allowed to stand at 80° C. for 2 hours to obtain a polymeric electrolyte having a thickness of 500 μm.

Example 2

Two grams of compound A-2, 8 g of B-8, 0.01 mol/kg of LiPF$_6$ and 0.01 g of AIBN were dissolved in 0.2 g of acetonitrile at 40° C. The mixture was poured between glass plates, and then allowed to stand at 80° C. for 2 hours. Acetonitrile was distilled off under reduced pressure to obtain a polymeric electrolyte having a thickness of 500 μm.

Examples 3 to 9

Polymeric electrolytes were obtained in the same manner as in Example 2 except that types and amounts of compounds and electrolytic salts shown in Table 4 below were used.

Examples 10 to 12

Polymeric electrolytes were obtained in the same manner as in Example 1 except that types and amounts of compounds, electrolytic salts and aprotic solvents shown in Table 4 below were used.

Comparative Examples 1 and 2

Polymeric electrolytes were obtained in the same manner as in Example 2 except that types and amounts of compounds and electrolytic salts shown in Table 4 below were used.

Comparative Example 3

One gram of polyethylene oxide (PEO) having a molecular weight of 1,000,000 and 1 mol/kg of LiBF$_4$ were dissolved in 0.2 g of acetonitrile at 40° C., and the mixture was poured between glass plates. Acetonitrile was then distilled off under reduced pressure to obtain a polymeric electrolyte having a thickness of 500 μm.

[Measurement of a Lithium Ion Transport Rate]

Each of the polymeric electrolytes obtained in the foregoing Examples and Comparative Examples was cut in a circle having a diameter of 13 mm, and this was held between lithium metal electrodes having the same diameter. A lithium ion transport rate was measured by a DC polarization method. The results are also shown in Table 4.

TABLE 4

| | Polymeric compound precursor | | Electrolytic salt and its concentration (mol/kg) | | Aprotic solvent | Lithium ion transport rate |
|---|---|---|---|---|---|---|
| Example | | | | | | |
| 1 | A-1 1 g | B-10 9 g | LiBF$_4$ | 1 | GBL 1.2 g | 0.88 |
| 2 | A-2 2 g | B-8 8 g | LiPF$_6$ | 0.01 | — | 0.88 |
| 3 | A-3 3 g | B-3 7 g | — | — | — | 0.86 |
| 4 | A-4 4 g | B-2 6 g | — | — | — | 0.84 |
| 5 | A-5 5 g | B-9 5 g | — | — | — | 0.83 |
| 6 | A-6 6 g | B-9 4 g | — | — | — | 0.88 |
| 7 | A-7 7 g | B-5 3 g | — | — | — | 0.86 |
| 8 | A-8 8 g | B-1 2 g | — | — | — | 0.83 |
| 9 | A-9 9 g | B-4 1 g | LiCl | 0.5 | — | 0.85 |
| 10 | A-10 1 g | B-6 7 g | LiF | 3 | EC 1.5 g, DO 2.5 g | 0.83 |
| 11 | A-3 1 g | B-3 6 g | LiBr | 0.3 | EC 0.5 g, SL 0.5 g | 0.83 |
| 12 | A-2 1 g | B-7 5 g | LiN(CF$_3$SO$_2$)$_2$ | 6 | EC 27 g, DME 27 g | 0.86 |
| Comparative Example | | | | | | |
| 1 | | B-7 1 g | — | — | — | unmeasurable |
| 2 | A-1 10 g | B-5 1 g | LiCl | 15 | — | unmeasurable |

TABLE 4-continued

| | Polymeric compound precursor | Electrolytic salt and its concentration (mol/kg) | | Aprotic solvent | Lithium ion transport rate |
|---|---|---|---|---|---|
| 3 | PEO 1 g | LiBF$_4$ | 1 | — | 0.08 |

*EC: ethylene carbonate, GBL: γ-butyrolactone, DO: 1,3-dioxolane, DME: 1,2-dimethoxyethane, SL: sulfolane

INDUSTRIAL APPLICABILITY

The polymeric electrolyte of the invention is greatly improved in a transport rate of charge carrier ions as compared with the ordinary ones. A transport rate refers to a rate of transporting anions and cations. Accordingly, when anions are fixed in a polymer chain and less moved, a rate of transporting cations is relatively increased consequently, which is considered to contribute toward improvement of a transport rate.

The polymeric electrolyte of the invention can be applied to various electric devices. Owing to the above-described characteristics, for example, cells having a higher voltage and a higher capacity than usual ones can be obtained. Although the usage of cells is not particularly limited, they are preferably used in portable electric appliances such as a video, a camera, a personal computer, a cellular phone and the like.

The invention claimed is:

1. An ion-conductive polymeric compound represented by the following general formula (1)

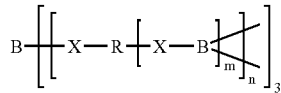 (1)

wherein X represents a hetero-atom, R represents a divalent to hexavalent group having a molecular weight of at least 150, m represents an integer of 1 to 5, and n represents a recurring number of 1 or more.

2. The ion-conductive polymeric compound according to claim 1, wherein the hetero-atom represented by X in general formula (1) is an oxygen atom.

3. The ion-conductive polymeric compound according to claim 1, wherein the group represented by R in general formula (1) is a polymer or a copolymer of compound (A) represented by the following formula (2) and/or compound (B) represented by the following formula (3)

compound (A)

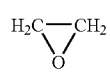 (2)

compound (B)

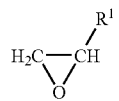 (3)

wherein R$^1$ represents a methyl group, an ethyl group, a propyl group, a butyl group or a group represented by the following formula (4)

—CH$_2$O—[—CH$_2$CH$_2$O—]$_r$—Ra   (4)

wherein r represents 0 or an integer of 1 or more, and Ra represents a methyl group, an ethyl group, a propyl group or a butyl group.

4. An ion-conductive polymeric compound having the following general formula (5)

 (5)

wherein R represents a divalent group having a molecular weight of at least 150, represented by the following formula (6), and n represents a recurring number of 1 or more

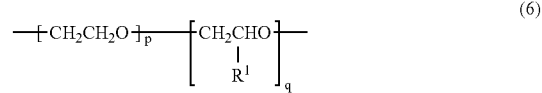 (6)

wherein R$^1$ is a methyl group, an ethyl group, a propyl group, a butyl group or a group represented by the following formula (4), p represents an integer of 0 to 38,000, and q represents an integer of 0 to 28,000, provided p and q are not 0 at the same time —CH$_2$O—[—CH$_2$CH$_2$O—]$_r$—Ra   (4)

wherein r represents 0 or an integer of 1 or more, and Ra represents a methyl group, an ethyl group, a propyl group or a butyl group.

5. An ion-conductive polymeric compound obtained by crosslinking a compound represented by the following general formula (7)

B—[—X—R—Y]$_3$   (7)

wherein X represents a hetero-atom, R represents a divalent group having a molecular weight of at least 150, and Y represents a polymerizable functional group.

6. The ion-conductive polymeric compound according to claim 5, wherein R in general formula (7) is a polymer or a copolymer of compound (A) represented by the following formula (2) and/or compound (B) represented by the following formula (3)

compound (A) (2)

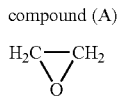

compound (B) (3)

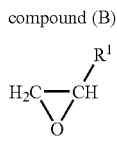

wherein $R^1$ represents a methyl group, an ethyl group, a propyl group, a butyl group or a group represented by the following formula (4)

$$—CH_2O—[—CH_2CH_2O—]_r—Ra \quad (4)$$

wherein r represents 0 or an integer of 1 or more, and Ra represents a methyl group, an ethyl group, a propyl group or a butyl group.

7. The ion-conductive polymeric compound according to claim 5 or 6, wherein the compound represented by general formula (7) is represented by the following general formula (8)

$$B—[O—R—Y]_3 \quad (8)$$

wherein R represents a divalent group having a molecular weight of at least 150, represented by the following formula (6), and Y represents a polymerizable functional group

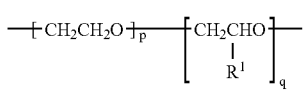 (6)

wherein $R^1$ represents a methyl group, an ethyl group, a propyl group, a butyl group or a group represented by the following formula (4), p represents an integer of 0 to 38,000, and q represents an integer of 0 to 28,000, provided p and q are not 0 at the same time $$—CH_2O—[—CH_2CH_2O—]_r—Ra \quad (4)$$

wherein r represents 0 or an integer of 1 or more, and Ra represents a methyl group, an ethyl group, a propyl group or a butyl group.

8. The ion-conductive polymeric compound according to claim 5 or 6, wherein the polymerizable functional group represented by Y is one or more selected from the group consisting of an acrylic residue, a methacrylic residue, an allyl group and a vinyl group.

9. An ion-conductive polymeric compound obtained by polymerizing a mixture of compounds represented by the following formulas (9) and (10) respectively,

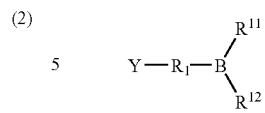 (9)

wherein $R_1$ represents a divalent group having a molecular weight of at least 100, Y represents a polymerizable functional group, and $R^{11}$ and $R^{12}$, which may be the same or different, each represent a hydrogen atom, a halogen atom or a monovalent group, or $R^{11}$ and $R^{12}$ are bound to each other to form a ring $$Z—[R_2—Y]_k \quad (10)$$

wherein $R_2$ represents a divalent group having a molecular weight of at least 150, Y represents a polymerizable functional group, Z represents an active hydrogen residue, and k represents an integer of 2 to 6.

10. The ion-conductive polymeric compound according to claim 9, wherein $R_1$ in general formula (9) and/or $R_2$ in general formula (10) is a polymer of compound (A) represented by the following formula (2) and/or compound (B) represented by the following formula (3)

compound (A) (2)

compound (B) (3)

wherein $R^1$ represents a methyl group, an ethyl group, a propyl group, a butyl group or a group represented by the following formula (4)

$$—CH_2O—[—CH_2CH_2O—]_r—Ra \quad (4)$$

wherein r represents 0 or an integer of 1 or more, and Ra represents a methyl group, an ethyl group, a propyl group or a butyl group.

11. The ion-conductive polymeric compound according to claim 9, wherein $R_1$ in general formula (9) and/or $R_2$ in general formula (10) is a divalent group represented by the following formula

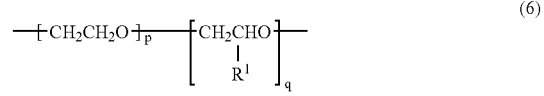 (6)

wherein $R^1$ represents a methyl group, an ethyl group, a propyl group, a butyl group or a group represented by the following formula (4), p represents an integer of 0 to 38,000, and q represents an integer of 0 to 28,000, provided p and q are not 0 at the same time

 (4)

wherein r represents 0 or an integer of 1 or more, and Ra represents a methyl group, an ethyl group, a propyl group or a butyl group.

12. The ion-conductive polymeric compound according to claim 9, wherein $R^{11}$ and $R^{12}$ in general formula (9) are one or more selected from the group consisting of an alkyl group, an aryl group, derivatives thereof and fluorine-substituted derivatives thereof.

13. A polymeric electrolyte using one or more types of the ion-conductive polymeric compound according to any one of claims 2, 4, 5 and 9.

14. A polymeric electrolyte comprising one or more types of the ion-conductive polymeric compound according to any one of claims 1, 4, 5 and 9, and an electrolytic salt.

15. The polymeric electrolyte according to claim 14, further comprising a nonaqueous solvent.

16. The polymeric electrolyte according to claim 15, wherein the nonaqueous solvent is an aprotic solvent.

17. A polymeric electrolyte, comprising a polymeric compound having a structural unit represented by the following general formula (11) in a molecule

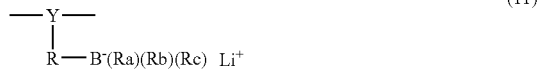 (11)

wherein Y represents a residue of a polymerizable functional group, R represents a group capable of being bound to the polymerizable functional group and the boron atom and having a molecular weight of at least 40, and Ra, Rb and Rc, which may be the same or different, each represent a group capable of being bound to the boron atom.

18. The polymeric electrolyte according to claim 17, wherein the polymeric compound is a copolymer further having a structural unit represented by the following general formula (12)

 (12)

wherein Y represents a residue of a polymerizable functional group, Z represents a residue of an active hydrogen compound, R' represents a divalent group having a molecular weight of at least 150, and k represents an integer of 2 to 6.

19. The polymeric electrolyte according to claim 17, which further comprises an aprotic solvent.

20. The polymeric electrolyte according to any one of claims 17 to 19, which further comprises an electrolytic salt.

21. The polymeric electrolyte according to claim 14, wherein the electrolytic salt is a lithium salt.

22. The polymeric electrolyte according to claim 21, wherein the lithium salt is one or more selected from the group consisting of $LiBF_4$, $LiPF_6$, $LiClO_4$, $LiAsF_6$, $LiCF_3SO_3$, $LiN(CF_3SO_2)_2$, $LiN(C_2F_5SO_2)_2$, $LiC(CF_3SO_2)_3$, LiCl, LiF, LiBr, LiI, and derivatives thereof.

23. The polymeric electrolyte according to claim 19, wherein the aprotic solvent is one or more selected from the group consisting of carbonates, lactones, ethers, sulfolanes and dioxolanes.

24. An electric device comprising the polymeric electrolyte according to claim 13.

25. A cell comprising a positive electrode, a negative electrode and the polymeric electrolyte according to claim 13, said electrodes being linked through said electrolyte.

26. The cell according to claim 25, wherein the positive electrode is made of a double metal oxide capable of occluding and releasing lithium ions, and the negative electrode is made of a lithium metal, a lithium alloy or a compound capable of occluding and releasing lithium ions reversibly.

27. The polymeric electrolyte according to claim 16, wherein the aprotic solvent is one or more selected from the group consisting of carbonates, lactones, ethers, sulfolanes and dioxolanes.

* * * * *